(12) United States Patent
Fong et al.

(10) Patent No.: US 11,386,119 B2
(45) Date of Patent: Jul. 12, 2022

(54) SYSTEM AND METHOD FOR DATA ORCHESTRATION FOR NON-RELATIONAL DATABASES AND KEY-VALUE STORAGE IN MULTIPLE COMPUTING ENVIRONMENTS

(71) Applicant: EMC IP Holding Company LLC, Hopkinton, MA (US)

(72) Inventors: Victor Fong, Medford, MA (US); Xuebin He, Westwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 233 days.

(21) Appl. No.: 16/777,929

(22) Filed: Jan. 31, 2020

(65) Prior Publication Data
US 2021/0240728 A1  Aug. 5, 2021

(51) Int. Cl.
| | | |
|---|---|---|
| *G06F 16/00* | (2019.01) |
| *G06F 16/27* | (2019.01) |
| *G06F 16/23* | (2019.01) |
| *G06F 16/2455* | (2019.01) |
| *G06F 16/903* | (2019.01) |

(52) U.S. Cl.
CPC ......... *G06F 16/27* (2019.01); *G06F 16/2336* (2019.01); *G06F 16/24552* (2019.01); *G06F 16/24554* (2019.01); *G06F 16/90335* (2019.01)

(58) Field of Classification Search
CPC .............. G06F 16/27; G06F 16/90335; G06F 16/2336; G06F 16/24552; G06F 16/24554
See application file for complete search history.

(56) References Cited

U.S. PATENT DOCUMENTS

| | | | |
|---|---|---|---|
| 8,484,259 B1 * | 7/2013 | Makkar ............. | G06F 16/90335 707/827 |
| 10,963,587 B1 * | 3/2021 | Namjoshi .............. | G06K 9/627 |
| 2006/0271557 A1 * | 11/2006 | Harward ............. | G06F 9/45504 |
| 2007/0022108 A1 * | 1/2007 | Nakadai ............. | G06F 16/24564 |
| 2008/0065640 A1 * | 3/2008 | Shulman ............. | G06F 16/2443 |
| 2016/0246841 A1 * | 8/2016 | Pesala ................. | G06F 16/9535 |
| 2017/0091192 A1 * | 3/2017 | Kuralenok ............ | G06F 16/248 |
| 2017/0171214 A1 * | 6/2017 | Anderson ............. | H04L 63/104 |
| 2018/0060365 A1 * | 3/2018 | Mujumdar ............ | G06F 16/211 |
| 2018/0357237 A1 * | 12/2018 | Balasubrahmanian ..................... G06F 16/2365 |

* cited by examiner

*Primary Examiner* — Alexander Khong
(74) *Attorney, Agent, or Firm* — Chamberlain, Hrdlicka, White, Williams & Aughtry (57) ABSTRACT

A method for managing data includes obtaining, by a database proxy server, a document manifest, wherein the document manifest specifies a plurality of queries, wherein each of the plurality of queries specifies data and a policy to be implemented on the data, wherein the data is stored in a central database, and processing the plurality of queries.

17 Claims, 8 Drawing Sheets

SYSTEM AND METHOD FOR DATA ORCHESTRATION FOR NON-RELATIONAL DATABASES AND KEY-VALUE STORAGE IN MULTIPLE COMPUTING ENVIRONMENTS

BACKGROUND

Data may be stored in databases accessed by multiple computing devices. The management of the data may become complicated if the data is replicated and modified on other computing devices.

SUMMARY

In general, in one embodiment, the invention relates to a method for managing data. The method includes obtaining, by a database proxy server, a document manifest, wherein the document manifest specifies a plurality of queries, wherein each of the plurality of queries specifies data and a policy to be implemented on the data, wherein the data is stored in a central database, and processing the plurality of queries.

In general, in one embodiment, the invention relates to a non-transitory computer readable medium that includes computer readable program code, which when executed by a computer processor enables the computer processor to perform a method for managing data. The method includes obtaining, by a database proxy server, a document manifest, wherein the document manifest specifies a plurality of queries, wherein each of the plurality of queries specifies data and a policy to be implemented on the data, wherein the data is stored in a central database, and processing the plurality of queries.

In general, in one embodiment, the invention relates to a system that includes a processor and memory that includes instructions, which when executed by the processor, perform a method. The method includes obtaining, by a database proxy server, a document manifest, wherein the document manifest specifies a plurality of queries, wherein each of the plurality of queries specifies data and a policy to be implemented on the data, wherein the data is stored in a central database, and processing the plurality of queries.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to a method and system for orchestrating the data management of data in a central database and multiple local database. Embodiments of the invention may enable subsets of the central database to be stored in local databases. The data in the subsets may be written to locally and synchronized to the central database.

Embodiments of the invention may utilize locking and unlocking mechanisms on data that is to be written locally. The locking and unlocking mechanisms may reduce overlap in writing to the same data by two local data systems at one time.

Figure 1A:
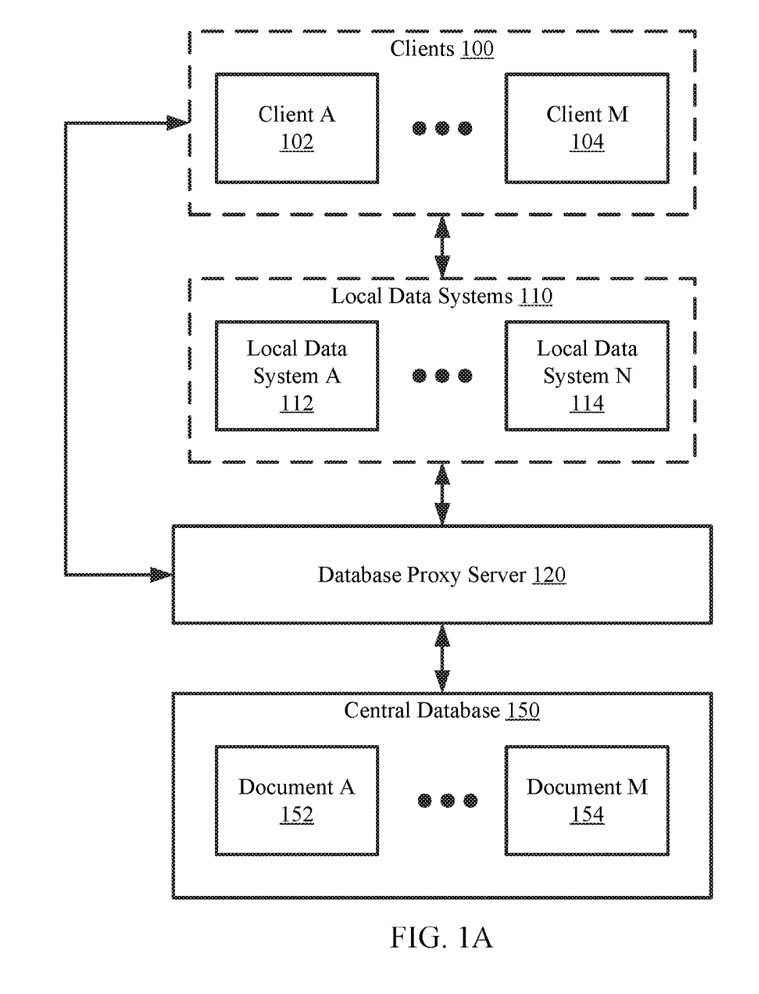
FIG. 1A shows a diagram of a system in accordance with one or more embodiments of the invention.

FIG. 1A shows a diagram of a system in accordance with one or more embodiments of the invention. The system may include clients (100), local data managers (110), a database proxy server (120), and a central database (150). Each component may be operably connected to any of the other components via any combination of wired and/or wireless connections. Each of the aforementioned components is discussed below.

In one or more embodiments of the invention, the clients (100) utilize the services of the local data managers (110). Specifically, the clients may read, write, watch, and/or otherwise access data from the local data systems (110). The data may be local data that may be synchronized with the data in the central database (150). Each client (102, 104) may include functionality to initiate requests to store data from the central database (150) to the local data systems (110). The requests may be sent to the database proxy server (120).

Figure 4:
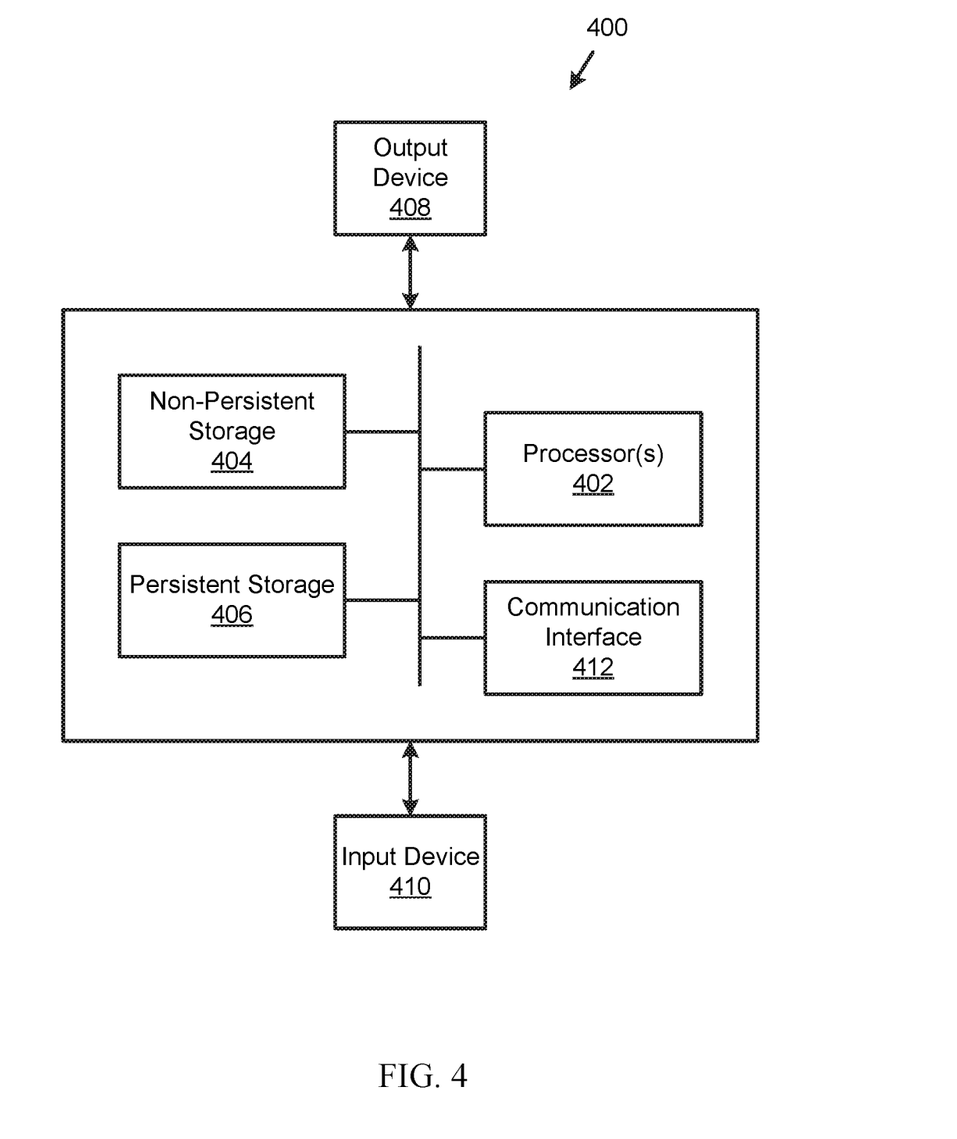
FIG. 4 shows a diagram of a computing device in accordance with one or more embodiments of the invention.

In one or more embodiments of the invention, a client (102, 104) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the local data systems (110) manage data. The data may be data replicated from the central database (150) and/or data modified by the clients (100). The local data systems (110) may include local databases (discussed below) that are managed by the database proxy server (120).

In one or more embodiments of the invention, each local data system (112, 114) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the database proxy server (120) described throughout this application.

In one or more embodiments of the invention, each local data system (112, 114) is implemented as a logical device. The logical device may utilize the computing resources of any number of computing devices and thereby provide the functionality of the database proxy server (120) described throughout this application. The logical device may be, for example, a cloud service. Each computing device in the cloud service may communicate with other computing devices in the cloud service via any protocol such as, for example, transmission control protocol (TCP), hypertext transfer protocol (HTTP), internet protocol (IP), and/or any other protocol without departing from the invention.

In one or more embodiments of the invention, the database proxy server (120) manages the data stored in the central database (150) and/or the local database systems (110). The database proxy server (150) may manage the data by servicing document manifests obtained from the clients (100). In one or more embodiments of the invention, a document manifest is a data structure that includes a number of queries. Each query may specify implementing policies on the data. The policies may include for example, "read", "write", "watch", and "lazy." Based on the policies, the database proxy server (120) may include functionality to send copies of the documents (152, 154) to the local data systems (110). Each of the aforementioned policies is discussed below.

In one or more embodiments of the invention, the "read" policy specifies obtaining, by a local data system (112, 114), a copy of one or more documents (152, 154) from the central database (150) to be accessed from the local data system (112, 114). The copies may be of entire documents or of portions of the documents (also referred to as attributes).

In one or more embodiments of the invention, the "write" policy specifies obtaining a copy of one or more documents (152, 154) from the central database (150) to be accessed and modified from the local data systems (110). Any modifications to the copies of the document or attributes of the documents may be synchronized back to the central database (150).

In one or more embodiments of the invention, any documents implemented with a "write" policy undergoes a locking mechanism and is subsequently locked. Any document (or attributes in the document) that have been locked cannot be written to by another local data system (112, 114) until the document (or attributes) are unlocked. However, the other local data systems (112, 114) may implement other policies (e.g., "read" policies) on a document that has been locked.

In one or more embodiments of the invention, the "watch" policy specifies maintaining copies of the documents in the local data systems (110) that are updated as the original documents in the central database (150) are modified.

For example, the "watch" policy may specify sending a copy of a document (e.g., 152) to a local data system (e.g., 112) and making changes to the copy of the document (152) that reflect any changes made to the document (152) in the central database (150). The changes may be in response to a synchronization of a document with a "write" policy implemented by a second local data system (e.g., 114). In other words, as the second local data system (114) writes to the document (152), the changes made to the document (152) are propagated to the copy of the document stored in the first local data system (112).

In one or more embodiments of the invention, the "lazy" policy specifies obtaining metadata associated with one or more collections. In one or more embodiments of the invention, a collection is a grouping of documents (152, 154). The metadata of a collection may specify the types of documents maintained in the collection, the number of documents in the collection, a size of the collection (e.g., a sum of the data size of each document), and/or any other metadata associated with the collection without departing from the invention.

In one or more embodiments of the invention, the database proxy server (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the database proxy server (120) described throughout this application and/or all, or a portion thereof, the methods illustrated in FIGS. 2A-2C.

In one or more embodiments of the invention, the database proxy server (120) is implemented as a logical device. The logical device may utilize the computing resources of any number of computing devices and thereby provide the functionality of the database proxy server (120) described throughout this application and/or all, or a portion thereof, the methods illustrated in FIGS. 2A-2C.

In one or more embodiments of the invention, the central database (150) stores data. The data may be documents (152, 154). In one or more embodiments of the invention, a document is any type of data that specifies any amount of information. A document may be, for example, a tree of fields. Each field may include attributes such as, for example, a name, a type, and a value. A document (152, 154) may be a collection of these fields.

In one or more embodiments of the invention, the central database (150) implements a key-value storage when storing the documents (152, 154). In one or more embodiments of the invention, a key-value storage is a data structure that associates a key and a value. The key may be a string of any combination of numbers, letters, and characters that is uniquely associated with the value. The value may be the document.

In one or more embodiments of the invention, the central database (150) is a non-relational database. In one or more embodiments of the invention, a non-relational database is a type of database in which each document in the database is not based (or otherwise does not depend on) other documents in the database.

While not illustrated in FIG. 1A, the central database (150) may include a database server that communicates with the database proxy server (120) when servicing requests to write or read any data in the central database (150).

In one or more embodiments of the invention, the central database (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the central database (150) described throughout this application.

In one or more embodiments of the invention, the central database (150) is implemented as a logical device. The logical device may utilize the computing resources of any number of computing devices and thereby provide the functionality of the backup server (120) described throughout this application.

Figure 1B:
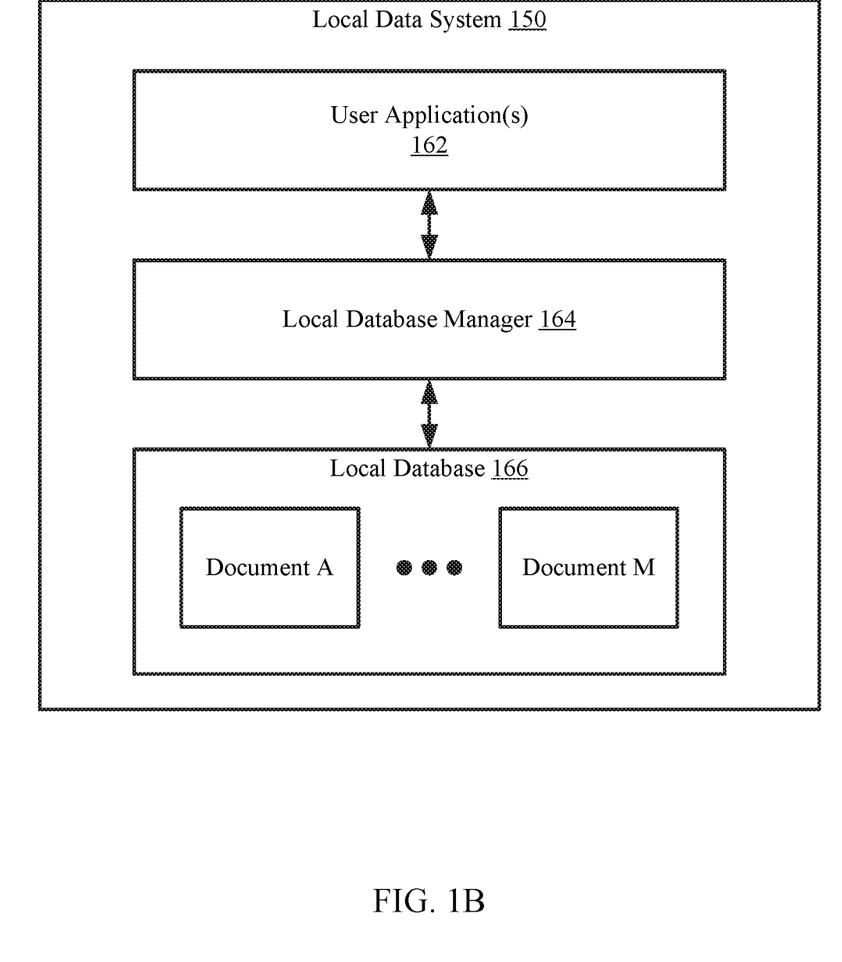
FIG. 1B shows a diagram of a local data system in accordance with one or more embodiments of the invention.

FIG. 1B shows a diagram of a local data system in accordance with one or more embodiments of the invention. The local data system (160) may be similar to a local data system (112, 114, FIG. 1A) discussed above. As discussed above, the local data system (160) may store copies of documents of the central database. The local data system (160) may include one or more user application(s) (162), a local database manager (164), and a local database (166). The local data system (160) may include additional, fewer, and/or different components. Each of the aforementioned components are discussed below.

In one or more embodiments of the invention, the user application(s) are applications that enable clients (e.g., 100, FIG. 1A) to access the data in the local database (166). The user application(s) (162) may communicate with the local database manager (164) to read, write, and/or otherwise access data in the local database (166).

In one or more embodiments of the invention, the local database manager (164) includes functionality to access the data in the local database (166) to be provided to the user application(s) (162). The local database manager (164) may access the data by servicing read or write requests obtained from the user application(s) (162). The read requests may specify allowing the user application(s) (162) to access the data. The write requests may specify allowing the user application(s) (164) to modify the data.

In one or more embodiments of the invention, the local database manager (164) further includes functionality to service queries in a document manifest. The queries, as discussed above, may include policies that may specify copying data from the central database and storing the copies in the local database (166).

In one or more embodiments of the invention, the local database manager (164) is implemented as computer instructions, e.g., computer code, stored on a persistent storage of the local data system (160) that when executed by a processor of the local data system (160) cause the local data system (160) to provide the functionality of the local database manager (164) described throughout this application.

In one or more embodiments of the invention, the local database manager (164) is an embodiment of the database proxy server (120, FIG. 1A) discussed above. For example, the database proxy server of FIG. 1A may be a software application executing on each local data system (e.g., 112, 114, FIG. 1A). The local database manager (164) may be an instance of the application executing on the local data system (160). In such embodiment, the data in the central database (150, FIG. 1A) and the data in the local database (166) is accessed by the user application(s) (162) via the local database manager (164).

In one or more embodiments of the invention, the local database (166) stores data. The data may be copies of documents of the central database. In this manner, the data stored in the local database (166) may be a subset of the data stored in the central database.

Figure 2A:
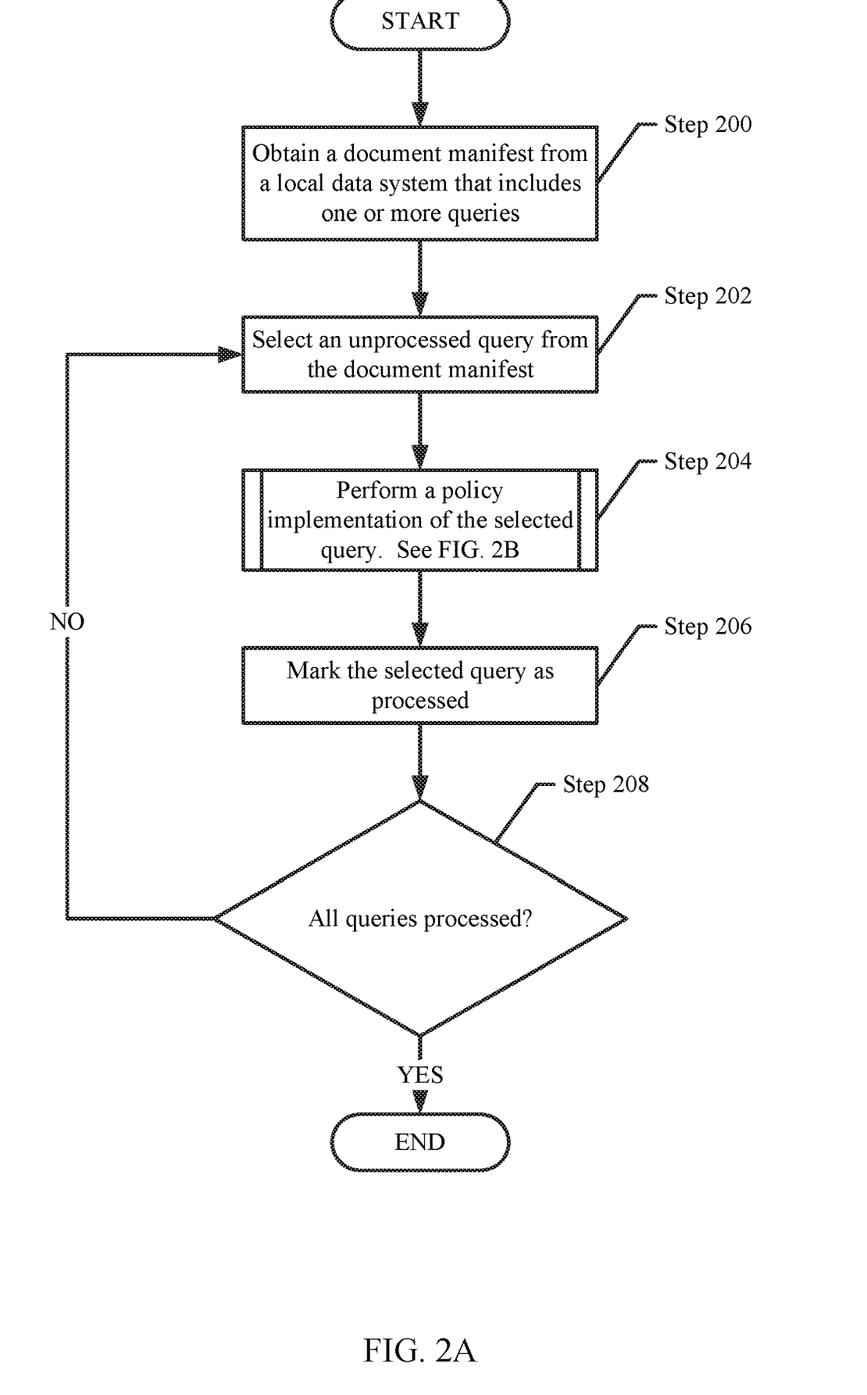
FIG. 2A shows a flowchart for processing a manifest in accordance with one or more embodiments of the invention.
Figure 2B:
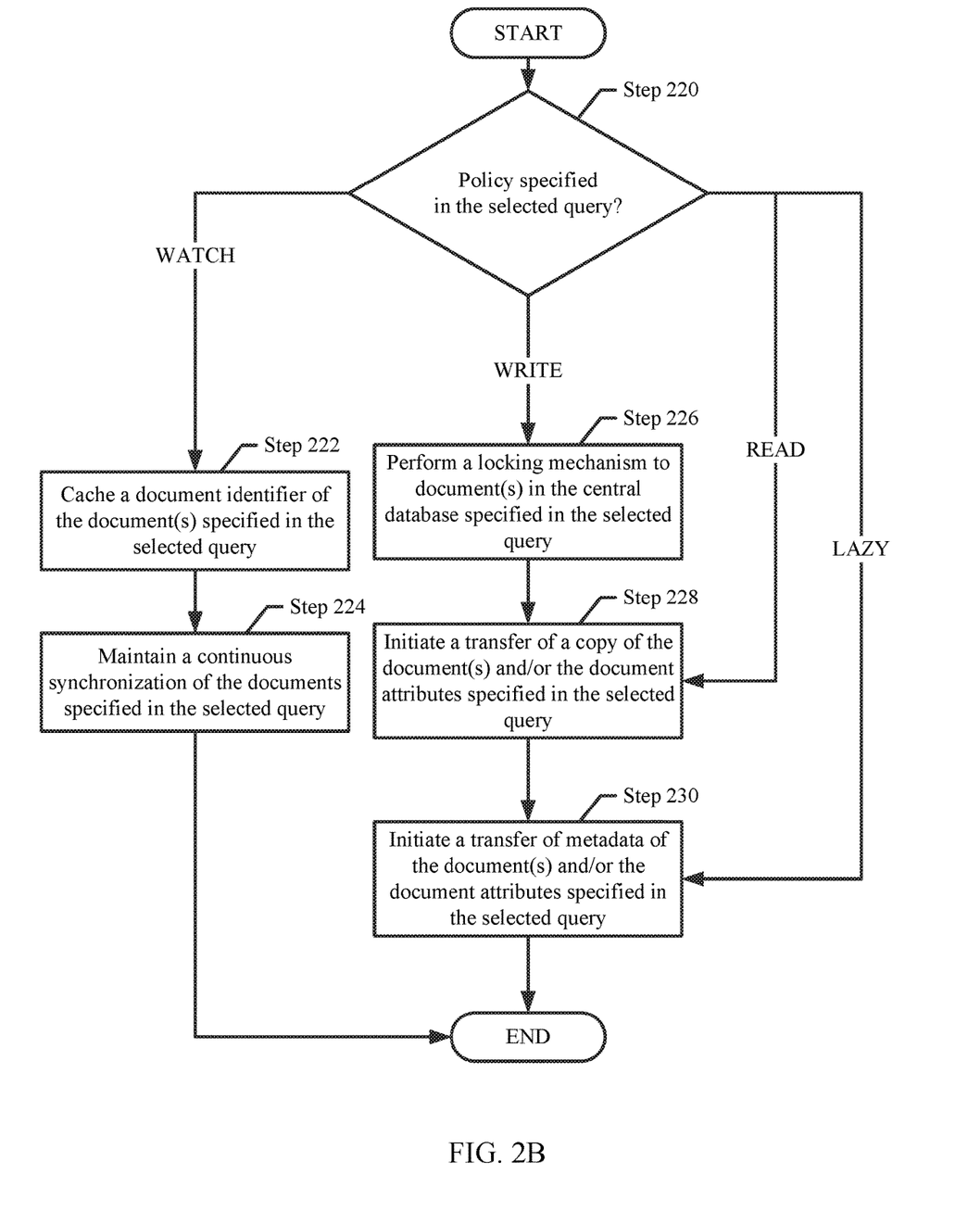
FIG. 2B shows a flowchart for implementing a policy of a query in accordance with one or more embodiments of the invention.
Figure 2C:
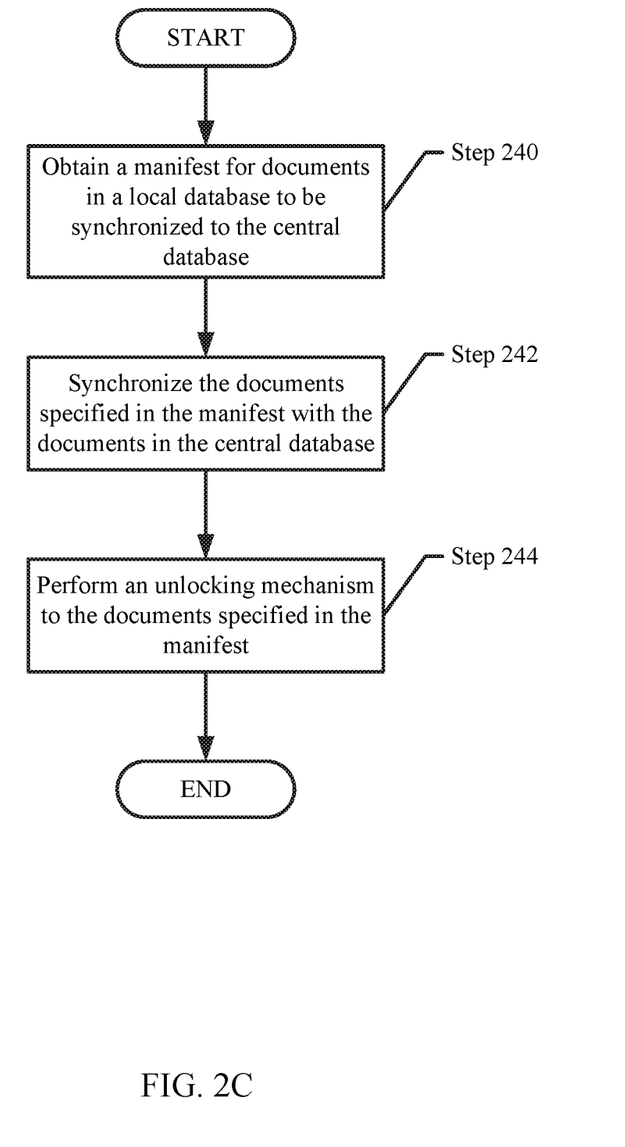
FIG. 2C shows a flowchart for synchronizing data written from a local database in accordance with one or more embodiments of the invention.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for processing a document manifest in accordance with one or more embodiments of the invention. The method shown in FIG. 2A may be performed by, for example, a database proxy server (120, FIG. 1A). Other components of the system illustrated in FIG. 1A may perform the method of FIG. 2A without departing from the invention.

In step 200, a document manifest is obtained from a local data system that includes one or more queries. In one or more embodiments of the invention, the document manifest includes any number of queries. Each query may specify one or more documents and a policy to be implemented on the document(s).

In step 202, an unprocessed query is selected from the document manifest.

In step 204, a policy implementation is performed on the selected query. In one or more embodiments of the invention, the policy implementation may include generating copies of the document(s) (or metadata of the document(s)) specified in the selected query and sending the copies to the local data system. The policy implementation may be performed via the method illustrated in FIG. 2B. The policy implementation may be performed via any other method without departing from the invention.

In step 206, the selected query is marked as processed.

In step 208, a determination is made about whether all queries in the manifest have been processed. If all queries in the manifest have been processed, the method ends following step 208; otherwise, the method proceeds to step 202.

FIG. 2B shows a flowchart for performing a policy implementation of a query in accordance with one or more embodiments of the invention. The method shown in FIG.

2B may be performed by, for example, a database proxy server (120, FIG. 1A). Other components of the system illustrated in FIG. 1A may perform the method of FIG. 2B without departing from the invention.

In step 220, a determination is made about the policy specified in the selected query. If the policy is a "watch" policy, the method proceeds to step 222; if the policy is a "write" policy, the method proceeds to step 226; if the policy is a "read" policy, the method proceeds to step 228; if the policy is a "lazy" policy, the method proceeds to step 230.

In step 222, following the determination that the policy is a "watch" policy, a document identifier of each document specified in the selected query is cached. In one or more embodiments of the invention, the database proxy server stores a document identifier of the documents specified in the selected query. The document identifier(s) may be stored in a watch catalog.

In step 224, a continuous synchronization of the documents is maintained. In one or more embodiments of the invention, prior to the synchronization, the documents are copied to a local database of the local data system. The continuous synchronization is maintained by analyzing the watch catalog every time a new write request is obtained. The write request may be obtained from another local data system for writing data into the central database. The write request may specify a document via a document identifier. The database proxy server may service the write request by writing to the document in the central database and then analyzing the watch catalog to determine if the document is specified in the watch catalog. If the watch catalog specifies the document, the write request is repeated to the copy of the document stored in the local database. In this manner, the copies of the documents in the local database In step 226, following the determination that the policy is a "write" policy, a locking mechanism is performed on the document(s) specified in the selected query. In one or more embodiments of the invention, a locking mechanism is a method performed on a document that results in the document being locked. The document being locked may refer to a document where other local data systems are prevented from implementing a "write" policy on the document until the document is unlocked.

In one or more embodiments of the invention, the locking mechanism may include embedding the document with a tag that specifies that the document is locked. This tag may be detected by the database proxy server whenever a "write" policy is obtained to determine whether the document is locked. If the tag is applied to the document, the "write" policy is not implemented.

In one or more embodiments of the invention, the locking mechanism includes maintaining a locked document catalog in which all documents that are locked in the central database are specified. The documents may be specified using, for example, document identifiers each associated with a document. The database proxy server may maintain the locked document catalog and analyze it every time a "write" policy is obtained to determine whether the "write" policy is to be implemented.

While the method of FIG. 2B discusses a locking mechanism of embedding a tag or of maintaining a locked document catalog, other locking mechanisms may be implemented on the documents without departing from the invention.

In step 228, a transfer of a copy of the document(s) and/or the document attributes specified in the selected query is initiated. In one or more embodiments of the invention, the transfer includes generating a copy of the specified data (e.g., the documents and/or document attributes) and sending the data to the local data systems to be stored in a local database of the local data system.

In step 230, a transfer of metadata associated with the document(s) and/or the document attributes specified in the selected query is initiated. In one or more embodiments of the invention, the metadata may include any information about the documents and/or attributes. The metadata may include, for example, a size of the data, a number of attributes, and/or any other information associated with the documents.

In one or more embodiments of the invention, if step 230 follows the determination that the policy is a "lazy" policy, the metadata may further include metadata associated with the collection specified in the query. As discussed above, a collection is a grouping of documents. The selected query may specify implementing a "lazy" policy for a collection. The metadata transferred may be associated with the collection.

FIG. 2C shows a flowchart for synchronizing data written from a local database in accordance with one or more embodiments of the invention. The method shown in FIG. 2C may be performed by, for example, a database proxy server (120, FIG. 1A). Other components of the system illustrated in FIG. 1A may perform the method of FIG. 2C without departing from the invention.

In step 240, a manifest for documents in a local database is obtained. The manifest may specify synchronizing the documents to the central database. In one or more embodiments of the invention, the documents specified in the local database are locked as a result from implementing a "write" policy. Copies of the documents have been stored and modified in the local database. The manifest may specify synchronizing the copies of the documents with the corresponding documents in the central database.

In step 242, the documents specified in the manifest are synchronized with the documents in the central database. In one or more embodiments of the invention, the documents are synchronized by replacing the documents in the central database with the copies of the documents from the local database. The copies are transferred to the central database to be synchronized with the central database.

In step 244, an unlocking mechanism is performed on the documents specified in the manifest. In one or more embodiments of the invention, the unlocking mechanism includes performing a method that results in the document(s) being unlocked. Based on the implementation of the locking mechanism discussed in step 226, the unlocking mechanism updates the document(s) in such a way that the documents are no longer locked. For example, if the locking mechanism implemented on a document specifies embedding a tag on the document that specifies the document is locked, the unlocking mechanism may include removing the tag. As a second example, if the locking mechanism implemented on the document specifies updating a locked document catalog with the document identifier of the document, the unlocking mechanism may include removing the document identifier from the locked document catalog.

EXAMPLE

Figure 3A:
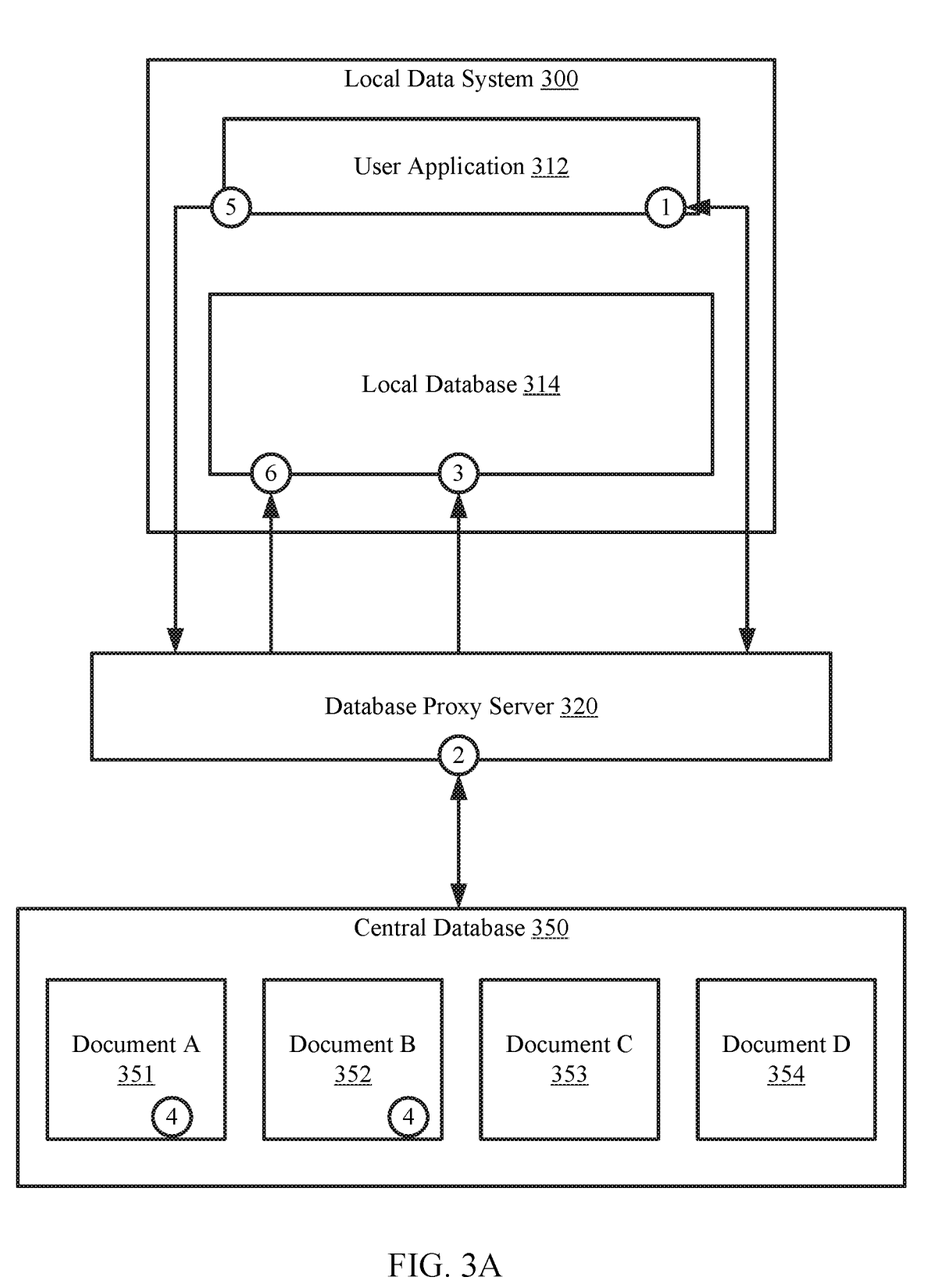
FIGS. 3A-3B show an example without departing from the invention.
Figure 3B:
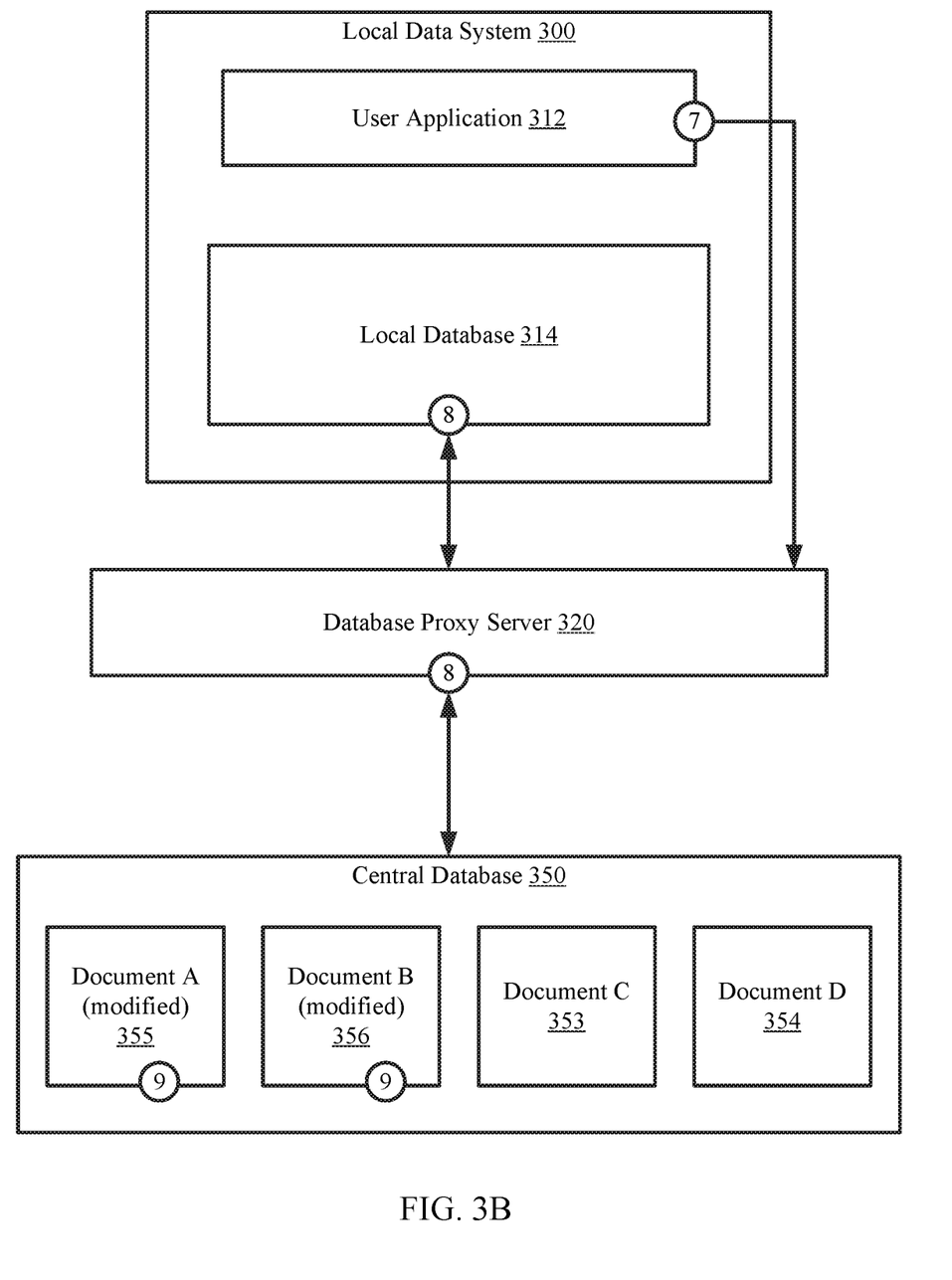

The following section describes an example. The example, illustrated in FIGS. 3A-3B, is not intended to limit the invention. Turning to the example, consider a scenario in which a local data system requests to store data from a central database locally. FIG. 3A shows a first diagram of an example system. The example system includes a local data system (300), a database proxy server (320), and a central database (350). For the sake of brevity, not all components in the system may be illustrated.

A user application (312) operating in the local data system (300) generates a document that is accessed by the database proxy server (320) [1]. The document manifest specifies a query that includes a "write" policy for all of document A (351) and document B (352). A second query in the document manifest includes a "read" policy for attributes A and B (not shown) of each of documents C (353) and D (354).

The database proxy server (320), in response to the document manifest, implements the two policies. Specifically, the database proxy server (320) provides a copy of documents A and B (351, 352) and of attributes A and B of documents C and D (353, 354). The aforementioned copies are stored in the local database (314) [3].

Additionally, documents A and B are locked [4]. By being locked, other local data systems (not shown) in the system may have access to implement "read," "watch," and "lazy" policies, but not for "write" policies.

After the copies are stored in the local database (314), the user application (312) sends a write request to the database proxy server (320) to write to documents A and B locally [5]. The database proxy server (320) processes the request and performs the writes on the local database (314) [6]. The result may be a modified copy of document A and a modified copy of document B stored in the local database (314).

FIG. 3B shows a second diagram of the example system. As shown in FIG. 3B, the user application, sends a manifest to the database proxy server. The manifest may specify to synchronize the local copies of documents A and B (351, 352) with the central database (350). The synchronization may include updating documents A (351) and B (352) with the modifications made to the modified copies of document A and document B.

The database proxy server, in response to the manifest, obtains the copies of documents A and B from the local database (314) to be stored in the database proxy server [8]. The database proxy server further replaces documents A and B (351, 352) to generate a modified document A (355) and a modified document B (356). In this manner, the data in the central database (350) is modified from the local database (314) and updated as the writes are requested. Because C and D were only implemented "read" policy in the local data system (300), no changes were made to documents C or D (353, 354) in the central database (350).

After the changes are made to documents A and B (355, 356), documents A and B (355, 356) are unlocked via an unlocking mechanism. As a result of the unlocking mechanism, "write" policies may now be implemented to the modified documents A and B (355, 356).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the orchestration of data in a database across multiple local data systems. Embodiments of the invention enable local data systems to store subsets of the central database locally, modifying the data locally, and synchronizing the local data with the central database. Such enablement of local data modification may reduce network traffic between multiple local data systems accessing the central database. Further, the network traffic may be reduced by reducing the amount of data that is transferred during writes by transmitting large subsets of the central database to the local data systems at one time.

Embodiments of the invention incorporate locking mechanisms on data that has been stored locally and is to be written to. The locking mechanism may prevent overlap in writing data between the subsets of data in multiple local data systems.

Thus, embodiments of the invention may address the problem of inefficient use of computing resources. This problem arises due to the technological nature of the environment in which restorations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   obtaining, by a database proxy server, a document manifest, wherein the document manifest specifies a plurality of queries, wherein each of the plurality of queries specifies data and a policy to be implemented on the data, wherein the data is stored in a central database; and
   processing the plurality of queries, wherein processing the plurality of queries comprises:
      selecting a query of the plurality of queries;
      based on the query specifying a watch policy, caching a document identifier of the data in the database proxy server; and
      maintaining a continuous synchronization of the data in the central database with a copy of the data in a local database.

2. The method of claim 1, wherein processing the plurality of queries further comprises:
   selecting a second query of the plurality of queries; and
   based on the second query specifying a read policy, initiating a transfer of a copy of the data from the central database to a local database.

3. The method of claim 1, wherein processing the plurality of queries further comprises:
   selecting a second query of the plurality of queries;
   based on the second query specifying a write policy, performing a locking mechanism to the data in the central database; and
   after performing the locking mechanism, initiating a transfer of a copy of the data from the central database to a local database.

4. The method of claim 3, further comprising:
   obtaining a second document manifest, wherein the second document manifest specifies a third query, wherein the third query specifies a policy for synchronizing the copy of the data to the central database; and
   based on the third query, synchronizing the copy of the data in the local database with the data in the central database.

5. The method of claim 4, further comprising:
   after synchronizing the copy of the data in the local database with the data in the central database, performing an unlocking mechanism to the data in the central database.

6. The method of claim 1, wherein processing the plurality of queries comprises:
   selecting a second query of the plurality of queries; and
   based on the second query specifying a lazy policy, initiating a transfer of metadata of the data from the central database to a local database.

7. A non-transitory computer readable medium comprising computer readable program code, which when executed by a computer processor enables the computer processor to perform a method for managing data, the method comprising:
   obtaining, by a database proxy server, a document manifest, wherein the document manifest specifies a plurality of queries, wherein each of the plurality of queries specifies data and a policy to be implemented on the data, wherein the data is stored in a central database; and
   processing the plurality of queries, wherein processing the plurality of queries comprises:
      selecting a query of the plurality of queries;
      based on the query specifying a watch policy, caching a document identifier of the data in the database proxy server; and
      maintaining a continuous synchronization of the data in the central database with a copy of the data in a local database.

8. The non-transitory computer readable medium of claim 7, wherein processing the plurality of queries further comprises:
   selecting a second query of the plurality of queries; and
   based on the second query specifying a read policy, initiating a transfer of a copy of the data from the central database to a local database.

9. The non-transitory computer readable medium of claim 7, wherein processing the plurality of queries further comprises:
   selecting a second query of the plurality of queries;
   based on the second query specifying a write policy, performing a locking mechanism to the data in the central database; and
   after performing the locking mechanism, initiating a transfer of a copy of the data from the central database to a local database.

10. The non-transitory computer readable medium of claim 9, the method further comprising:
    obtaining a second document manifest, wherein the second document manifest specifies a third query, wherein the third query specifies a policy for synchronizing the copy of the data to the central database; and
    based on the third query, synchronizing the copy of the data in the local database with the data in the central database.

11. The non-transitory computer readable medium of claim 10, the method further comprising:
    after synchronizing the copy of the data in the local database with the data in the central database, performing an unlocking mechanism to the data in the central database.

12. The non-transitory computer readable medium of claim 7, the method wherein processing the plurality of queries further comprises:
    selecting a second query of the plurality of queries; and
    based on the second query specifying a lazy policy, initiating a transfer of metadata of the data from the central database to a local database.

13. A system comprising:
    a processor; and
    memory comprising instructions, which when executed by the processor, perform a method comprising:
       obtaining, by a database proxy server, a document manifest, wherein the document manifest specifies a plurality of queries, wherein each of the plurality of queries specifies data and a policy to be implemented on the data, wherein the data is stored in a central database; and
       processing the plurality of queries, wherein processing the plurality of queries comprises:
          selecting a query of the plurality of queries;
          based on the query specifying a watch policy, caching a document identifier of the data in the database proxy server; and
          maintaining a continuous synchronization of the data in the central database with a copy of the data in a local database.

14. The system of claim 13, wherein processing the plurality of queries further comprises:

selecting a second query of the plurality of queries; and based on the second query specifying a read policy, initiating a transfer of a copy of the data from the central database to a local database.

15. The system of claim 13, the method further comprising:

selecting a second query of the plurality of queries;

based on the second query specifying a write policy, performing a locking mechanism to the data in the central database; and after performing the locking mechanism, initiating a transfer of a copy of the data from the central database to a local database.

16. The system of claim 15, the method further comprising:

obtaining a second document manifest, wherein the second document manifest specifies a third query, wherein the third query specifies a policy for synchronizing the copy of the data to the central database;

based on the third query, synchronizing the copy of the data in the local database with the data in the central database; and after synchronizing the copy of the data in the local database with the data in the central database, performing an unlocking mechanism to the data in the central database.

17. The system of claim 13, wherein processing the plurality of queries further comprises:

selecting a second query of the plurality of queries; and based on the second query specifying a lazy policy, initiating a transfer of metadata of the data from the central database to a local database.

* * * * *